(12) United States Patent
Tilove et al.

(10) Patent No.: US 7,974,737 B2
(45) Date of Patent: Jul. 5, 2011

(54) APPARATUS AND METHOD OF AUTOMATED MANUFACTURING

(75) Inventors: Robert Bruce Tilove, Rochester Hills, MI (US); Sandipan Bandyopadhyay, Chennai (IN)

(73) Assignee: GM Global Technology Operations LLC, Detroit, MI (US)

(*) Notice: Subject to any disclaimer, the term of this patent is extended or adjusted under 35 U.S.C. 154(b) by 917 days.

(21) Appl. No.: 11/928,157

(22) Filed: Oct. 30, 2007

(65) Prior Publication Data
US 2008/0125893 A1  May 29, 2008

Related U.S. Application Data

(60) Provisional application No. 60/863,612, filed on Oct. 31, 2006.

(51) Int. Cl.
*G05B 19/19* (2006.01)
(52) U.S. Cl. ........................................ 700/253; 700/255
(58) Field of Classification Search .................... 228/29, 228/102, 103; 901/16, 42; 219/50–553, 219/600–780; 700/240–264
See application file for complete search history.

(56) References Cited

U.S. PATENT DOCUMENTS

| | | | | |
|---|---|---|---|---|
| 4,086,522 A | * | 4/1978 | Engelberger et al. | 318/568.13 |
| 4,233,491 A | * | 11/1980 | Maruyama et al. | 219/125.1 |
| 4,338,672 A | * | 7/1982 | Perzley et al. | 700/249 |
| 4,578,757 A | * | 3/1986 | Stark | 701/301 |
| 4,877,940 A | * | 10/1989 | Bangs et al. | 219/124.34 |
| 4,943,702 A | * | 7/1990 | Richardson | 219/124.34 |
| 4,949,277 A | * | 8/1990 | Trovato et al. | 700/255 |
| 5,047,916 A | * | 9/1991 | Kondo | 700/61 |
| 5,061,841 A | * | 10/1991 | Richardson | 219/130.01 |
| 5,485,389 A | * | 1/1996 | Terada et al. | 700/178 |
| 5,572,102 A | * | 11/1996 | Goodfellow et al. | 318/568.13 |
| 5,880,956 A | * | 3/1999 | Graf | 700/86 |
| 5,910,894 A | * | 6/1999 | Pryor | 700/95 |
| 6,004,016 A | * | 12/1999 | Spector | 700/56 |
| 6,044,308 A | * | 3/2000 | Huissoon | 700/166 |
| 6,249,718 B1 | * | 6/2001 | Gilliland et al. | 700/255 |
| 6,282,460 B2 | * | 8/2001 | Gilliland et al. | 700/255 |
| 6,356,807 B1 | * | 3/2002 | McGee et al. | 700/253 |
| 6,356,808 B1 | * | 3/2002 | Stenberg | 700/254 |
| 6,507,767 B2 | * | 1/2003 | Bourne et al. | 700/165 |
| 6,583,386 B1 | * | 6/2003 | Ivkovich | 219/130.01 |
| 6,624,388 B1 | * | 9/2003 | Blankenship et al. | 219/130.5 |
| 6,847,922 B1 | * | 1/2005 | Wampler, II | 703/1 |
| 7,130,718 B2 | * | 10/2006 | Gunnarsson et al. | 700/254 |
| 7,298,385 B2 | * | 11/2007 | Kazi et al. | 345/633 |
| 7,590,468 B2 | * | 9/2009 | Watanabe et al. | 700/259 |
| 7,831,410 B2 | * | 11/2010 | McIntyre et al. | 702/183 |

(Continued)

*Primary Examiner* — Khoi Tran
*Assistant Examiner* — Majdi Alsomiri
(74) *Attorney, Agent, or Firm* — Quinn Law Group, PLLC

(57) ABSTRACT

An apparatus and method of optimizing collision free path planning comprising: initializing a plurality of feasible configuration points, sample points located in a free space, and sample points not located in the free space; determining a goodness rating of the various pluralities of points; generating new candidate points; determining if each new candidate point is a feasible configuration point and adding each to the plurality of feasible configuration points if it is; if not, determining if each new candidate point is located in the free space and adding it to the plurality of sample points located in the free space if it is; if not, adding to the plurality of sample points not located in the free space; determining an updated goodness rating of the various pluralities of points; determining if a termination criteria has been met and reporting a best solution or no solution if it has been met.

20 Claims, 2 Drawing Sheets

U.S. PATENT DOCUMENTS

| | | | |
|---|---|---|---|
| 2002/0094169 A1* | 7/2002 | Benator et al. | 385/55 |
| 2004/0186627 A1* | 9/2004 | Watanabe et al. | 700/264 |
| 2005/0049749 A1* | 3/2005 | Watanabe et al. | 700/245 |
| 2006/0178775 A1* | 8/2006 | Zhang et al. | 700/245 |
| 2006/0271240 A1* | 11/2006 | Nihei et al. | 700/245 |
| 2007/0075055 A1* | 4/2007 | Komatsu | 219/121.63 |
| 2008/0306630 A1* | 12/2008 | Fortell et al. | 700/251 |
| 2009/0157226 A1* | 6/2009 | de Smet | 700/254 |

* cited by examiner

APPARATUS AND METHOD OF AUTOMATED MANUFACTURING

CROSS-REFERENCE TO RELATED APPLICATIONS

This application claims priority to U.S. Provisional Patent Application No. 60/863,612, filed on Oct. 31, 2006, which is hereby incorporated by reference in its entirety.

TECHNICAL FIELD

The present invention relates generally to automated manufacture and assembly process planning, and more specifically to systems and methods of automated robotic welding for determining optimal weld gun orientations and robot path planning.

BACKGROUND OF THE INVENTION

Robots are mechanized programmable tools used widely in automated manufacturing processes. Robots are generally employed to perform repetitive tasks in a precise and time efficient manner. In a typical manufacturing process, a robot performs a repetitive sequence of point-to-point movements, coming to a stop at each point to perform a task.

Robots are utilized extensively in automobile production lines, for example, to apply spot welds to automobile frames at predetermined, programmed stop locations. Welding is a manufacturing process that bonds or joins materials, usually metals or thermoplastics, by causing coalescence—the process by which two separate units fuse or merge into a single body, through the application of intense heat, directed pressure, or both, at or along a weld joint. Automated robotic welding offers more precise placement of welds, in a more time efficient manner, than can otherwise be accomplished through the use of manual labor. Accordingly, automated robotic welding results in relatively less scrap materials, decreased rework, and increased output.

Determining the layout of individual robotic welding cells or workstations in an automobile production line is a key step in automotive Body in White Manufacturing process planning. Body in White (BIW) Manufacturing refers to the stage of automobile fabrication in which the vehicle body sheet metal, such as doors, hoods, and deck lids, has been assembled, but prior to the addition of powertrain components (e.g., motor, transmission, exhaust, etc) and trim accessories (e.g., windshields, seats, upholstery, electronics, etc.). Determining robotic cell layout is a highly iterative process, traditionally assisted by simulation software. While the simulation tools help in the computation of the results at each iteration, they do not provide direction for possible modifications or improvements to be made for the next iteration. Consequently, human expertise and judgment has traditionally played an important role in formulating the proposed layout. Conventionally, a geometrically feasible solution is considered satisfactory, even though downstream processes, such as robot programming and controls, may require significant rework to meet manufacturing criteria, e.g., "smoothness" of robot trajectories.

The efficiency of an individual robot cell, and thus the productivity of the entire assembly line, can be improved by minimizing the robot's cycle time for completing a work plan. The cycle time for any given robot cell depends on many parameters, such as the position of the manipulator (i.e., the mechanical portion of the robot) relative to each distinct task, the relative position of the task points, the sequence in which the task points are visited, the maximum velocity and acceleration of the various actuators (e.g., servomotors), and the configuration of the robotic arm. An ill-placed or improperly programmed robot risks inefficient operation and even failure.

A probabilistic roadmap planner or algorithm (PRM) is a motion planning technique commonly used for determining geometrically feasible robotic paths (i.e., a collision free path) and weld gun orientations in automated manufacturing processes. While PRMs and other similar path planners produce geometrically feasible solutions, the solutions may not meet other manufacturing criteria. For example, the path calculated, if one is found at all, may involve joint motions that are generally unacceptable for implementation on a manufacturing plant floor (e.g., excessive joint motion or stress on attached cables).

By way of clarification, FIG. 1 illustrates a multi-dimensional "configuration space", identified generally as 10, representative of all possible positions that a physical system, such as robotic welding cell, may attain, subject to external constraints. PRM planners function to build or compute a collision free path or "probabilistic roadmap" 12 inside a free space 11—defined as the collision-free subset of configuration space 10 inside border or edge 13. A point "Q" represents a specific robot configuration, e.g. a 6-tuple of joint angles, in configuration space 10 (which may or may not be in free space 11), while the shaded areas 14 each represent an obstacle or "object to avoid" in the configuration space 10. The objects or obstacles 14 are difficult to efficiently compute and represent explicitly. As an alternative, prior art PRM algorithms sample (e.g., through linear interpolation) the configuration space 10, performing "static collision detection" at sample points 16 and "dynamic collision detection" along a line or local path 18 connecting two sample points 16 to simulate the collision or intersection of two specific structures, such as a robot arm with one of the objects 14. The PRM algorithm thereafter adds the sample points 16 and continuously updates the roadmap until a termination criteria is satisfied, reporting either the best path found or that no path was found.

A conventional PRM algorithm requires "Start" and "Goal" configurations located in free space 11 be known or calculated a priori (i.e., proceeding from a known or assumed cause to a necessarily related effect). In typical weld processing, for example, the "home configuration", identified as Qh in FIG. 1, acts as the start configuration and each "weld point", represented collectively in FIG. 1 as Qg, acts as the goal configuration. Normally, the home configuration Qh and weld gun "approach vector" or "orientation vector"—i.e., the orientation of the weld gun about a tip for a given weld point, are specified in advance, traditionally using an iterative "generate and test" methodology. The resulting path will generally satisfy any geometric constraints, but may fail to meet other manufacturing parameters, often requiring significant modification later in the process.

Similarly, the goal configuration Qg (e.g., weld point) and weld gun orientation vectors are predetermined—e.g., weld tip must be approximately normal to the surface of the part at the weld joint, constraining, but not necessarily defining, an acceptable goal configuration. In other words, the goal configuration Qg that is in free space 11 may not be known a priori, and indeed may not exist. For example, the goal Qg is typically a set of acceptable configurations rather than a single point in configuration space 10 since a weld gun may be infinitely rotated about the tip. Consequently, prior practice is to manually test various orientations in an iterative and time consuming process.

In a typical scenario, the robot executes a cyclical motion—it starts and ends at the same home configuration Qh. However, automated solutions of the prior art do not systematically determine and jointly optimize all system design variables—e.g., the home position Qh for the robot, the orientations of the weld gun at the goal configuration Qg—e.g., weld point, and a collision free path 12 that visits a given sequence of weld locations.

SUMMARY OF THE INVENTION

The present invention provides improved methods of optimizing collision free path planning for automated manufacturing and automated robotic welding processes. The methods presented herein are operable to create and edit an intelligent road map and weld gun selection sequence based upon complex geometric shapes. The methods are also developed for assembly process verification that enable generation and editing of weld gun paths and sequences in a managed, 3-dimensional (3D) environment. The methods described herein allow for the systematic determination of optimal weld gun orientations and robotic paths, and automatically plan a collision free path from the initial, home configuration to the weld point, goal configuration.

The present invention provides for faster positioning and more precise, optimized weld gun orientations and home and weld point configurations, thereby improving work plan cycle times, increasing the efficiency of individual robot cells, and reducing or eliminating re-work by downstream activities (e.g., robot programming and control). In addition, reduced joint motion and component stress translates into realized extended robot life. Finally, the methods described herein allow for complete elimination of human intervention, negating associated labor costs, such as, but not limited to, engineering services typically contracted for in each vehicle program.

In a first preferred embodiment, a method of optimizing collision free path planning for an automated manufacturing cell is provided. The method includes the steps of: initializing a plurality of feasible configuration points; initializing a first plurality of sample points located in a free space; initializing a second plurality of sample points not located in the free space; determining an initial goodness rating of the first and second pluralities of sample points and the plurality of feasible configuration points; generating a plurality of new candidate points; determining if each new candidate point is a feasible configuration point; if yes, adding that respective new candidate point to the plurality of feasible configuration points; if no, determining if that respective new candidate point is located in the free space; if yes, adding that respective new candidate point to the first plurality of sample points; otherwise, adding that respective new candidate point to the second plurality of sample points if that respective new candidate is not located in the free space and is not a feasible configuration point; determining an updated goodness rating of the first and second pluralities of sample points and the plurality feasible configuration points; updating a motion planning algorithm; determining if a termination criteria has been met; if yes, reporting one of a best solution and no solution; if no, repeating all steps from the generation of a plurality of new candidate points and after.

Preferably, the plurality of feasible configuration points can be any one of a variety of configuration parameters used by the motion planning algorithm to calculate a collision free path, including, but not limited to, a home configuration and a goal configuration. In addition, the termination criteria is either an optimized goal configuration, an optimized home configuration, an optimized weld gun orientation, an optimized collision free path, a predetermined threshold number of iterations, or a combination thereof.

According to an alternate embodiment, an optimization methodology is used to generate the plurality of new candidate points. To this regard, the optimization methodology can be, for example, a genetic algorithm, an energy minimization technique, and an evolutionary computation method.

According to another alternate embodiment, the motion planning algorithm is a probabilistic roadmap path planner. In this instance, it is preferred that the method also include determining a preliminary collision free path inside the free space prior to determining the first goodness rating. Thereafter, an updated collision free path inside the free space is determined in response to the updating of the probabilistic roadmap path planner. Ideally, the updated collision free path is determined by the probabilistic roadmap path planner iteratively searching for a collision free path by adding at least one of said new candidate points to said first plurality of sample points or at least one edge to the free space, or both, at each iteration.

According to yet another embodiment, determining the initial and updated goodness ratings respectively includes determining an initial and updated cost function. In this instance, it is even further preferred that the goodness ratings are inversely proportional to their respective cost functions.

In a second embodiment of the present invention, a method of automating the determination of, and assuring the realization of optimal weld gun orientations and robot paths in a robotic welding system is provided. The robotic welding system includes a weld gun and one or more predetermined weld points. The method comprises: initializing a plurality of feasible configuration points; initializing a first plurality of sample points located in a free space; initializing a second plurality of sample points not located in the free space; determining an initial goodness rating of the first and second pluralities of sample points and the plurality of feasible configuration points; generating a plurality of new candidate points using an optimization methodology; determining if each new candidate point is a feasible configuration point; if yes, adding the respective new candidate point to the plurality of feasible configuration points; if not, determining if the respective new candidate point is located in the free space; if so, adding the respective new candidate point to the first plurality of sample points; otherwise, adding the respective new candidate point to the second plurality of sample points if it is not located in the free space and is not a feasible configuration point; determining an updated goodness rating of the first and second pluralities of sample points and the plurality feasible configuration points; updating a probabilistic roadmap path planner; determining if a termination criteria has been met, where the termination criteria is an optimized goal configuration, an optimized home configuration, an optimized weld gun orientation, an optimized collision free path, or a predetermined threshold number of iterations; if yes, reporting either a best solution or no solution; otherwise, repeating the generating a plurality of new candidate points and all subsequent steps.

In a third preferred embodiment of the present invention, an apparatus for welding one or more workpieces at a plurality of operating regions is provided. Preferably, the apparatus has a weld gun configured to selectively complete a welding operation at the various weld points. The apparatus also includes an automated support arm connected and thereby configured to reposition—e.g., translate, rotate, pivot, swing, the weld gun. A controller is connected to the support arm and weld gun and configured to control the repositioning and the selective welding of the weld gun.

The controller is programmed and configured to determine an optimization parameter by: initializing a plurality of feasible configuration points, a first plurality of sample points located in a free space, and a second plurality of sample points not located in the free space; subsequently, determining an initial goodness rating of the first and second pluralities of sample points and the plurality of feasible configuration points; thereafter or contemporaneously therewith, generating a plurality of new candidate points using an optimization methodology; determining if each new candidate point is a feasible configuration point; if so, adding the respective new candidate point to the plurality of feasible configuration points; if not, determining if the respective new candidate point is located in the free space; if so, adding the respective new candidate point to the first plurality of sample points; otherwise, adding the respective new candidate point to the second plurality of sample points if it is not located in the free space and is not a feasible configuration point; thereafter, determining an updated goodness rating of the first and second pluralities of sample points and the plurality feasible configuration points; then, updating the probabilistic roadmap path planner; next, determining if a termination criteria has been met and reporting either a best solution or no solution if the termination criteria has been met; otherwise, repeating the generating of a plurality of new candidate points and all subsequent steps if the termination criteria has not been met. Ideally, the optimization parameter includes at least one, but preferably all of an optimized goal configuration, an optimized home configuration, an optimized weld gun orientation, and an optimized collision free path.

The above features and advantages, and other features and advantages of the present invention will be readily apparent from the following detailed description of the preferred embodiments and best modes for carrying out the invention when taken in connection with the accompanying drawings and the appended claims.

DESCRIPTION OF THE PREFERRED EMBODIMENTS

Figure 2:
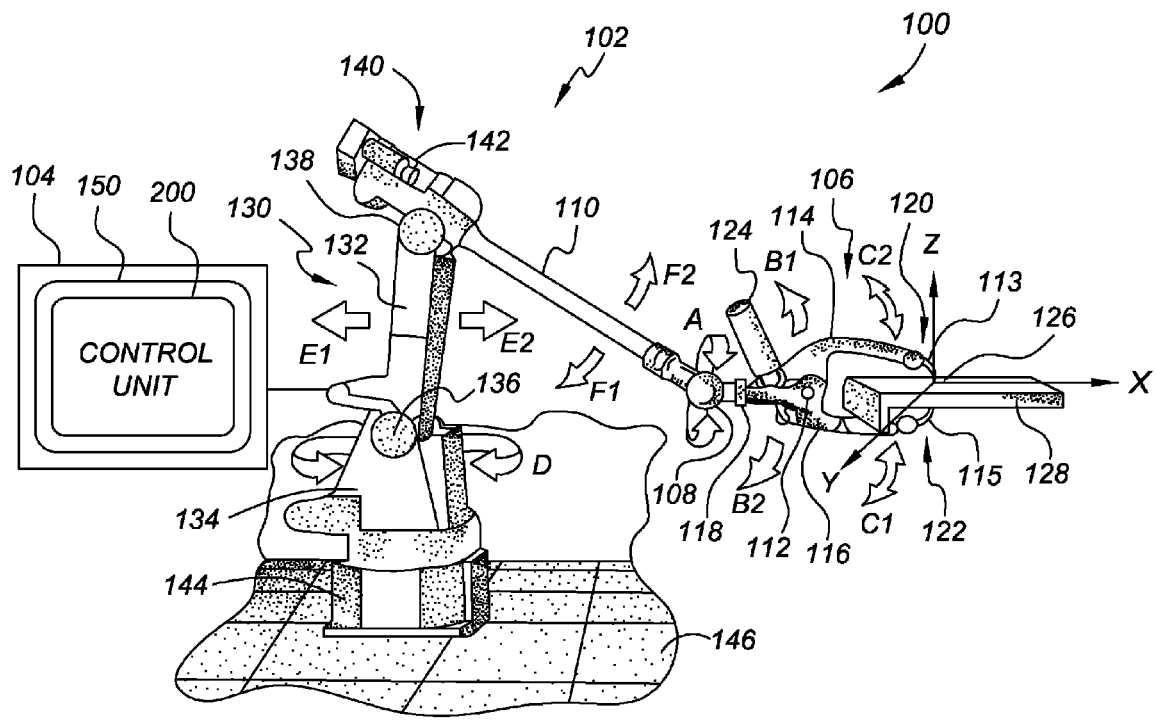
FIG. 2 is a partial side-schematic view of an exemplary automated robotic welding system or cell having a representative microprocessor-based control unit for carrying out the control of the present invention.

Referring to the figures, wherein like reference numbers refer to like components throughout the several views, there is shown an exemplary automated robotic welding cell or system, partially illustrated and identified generally in FIG. 2 as element 100. The present invention will be described herein with respect to the robotic welding cell 100 of FIG. 2 as an exemplary application by which the present invention may be incorporated and practiced. However, the present invention by no means is intended to be limited to the particular configuration or structure of FIG. 2. To that extent, the present invention can be used in a variety of automated manufacturing processes. By way of example, the apparatus and method provided herein can be employed for operating in a variety of welding processes, including single workpiece operations, joining two or more workpieces together, or for joining two ends of a single workpiece together, as well as non-welding based automated manufacturing processes, such as oil refining and the manufacture of industrial chemicals. In addition, the present invention can be applied in both 2-dimensional and 3-dimensional applications.

The robotic welding cell 100 includes an automated robot, identified generally at 102, operatively connected to a controller or electronic control unit (ECU) 104 and a weld gun, identified generally at 106. As will be described in further detail hereinbelow, the weld gun 106 is configured to selectively complete a welding operation at one or more weld points, collectively represented in FIG. 2 as weld point 126, along one or more workpieces 128.

The weld gun 106 is mounted to a robot arm 110 in a repositionable and re-orientable manner. In the figure denoted at 108 is a bracket or joint (also referred to in the art as a "robot wrist") for mounting the weld gun 106 to the robot arm 110 in a pivotable and rotatable manner. For example, the weld gun 106 is operable to rotate about a horizontal axis, e.g., the X-axis on the X-Y-Z Cartesian coordinate system in FIG. 2 (the motion depicted for illustrative purposes by arrow A), and pivot about another horizontal axis, e.g., the Y-axis (depicted for instructional purposes in FIG. 2 by arrows B1-B2), via robot wrist 108. The weld gun 106 is fixed to the robot wrist 108 at one end thereof via an attachment base portion 118.

The weld gun 106 also includes a pivotal mounting portion 112 adjacent the base portion 118 at which first and second welding gun arms 114 and 116, respectively, are mounted to open and close. The welding gun arms 114, 116 respectively include an electrode 113 and 115 at respective first and second tip ends 120 and 122 thereof. The electrodes 113, 115 are preferably arranged to be coaxially opposed with each other when in the closed position along, for example, axis Z, as depicted in FIG. 2. An actuator or servomechanism 124, is fixed adjacent to the attachment base portion 118 and operable to open and close the first and second welding gun arms 114, 116 and, thus, electrodes 113, 115 (depicted for illustrative purposes in FIG. 2 by arrows C1 and C2). The servomechanism 124 can be, by way of example, an electric, pneumatic, hydraulic, or magnetic device, or a combination thereof.

The robot 102 includes a stationary robot mount 144 configured and adapted to support the robot 102, and thus the weld gun 106. The robot mount 144 is shown in FIG. 2 as fixed to the floor 146 of a factory; however, it should be recognized that the robot mount 144 (and thus the robot 102) can be mounted at various other locations, including, but not limited to, a factory wall or ceiling (not shown), without departing from the scope of the invention claimed herein. A robot body assembly, indicated generally as 130, is mounted on the mount 108 for a swivel movement about a vertical axis Z (the motion depicted for illustrative purposes by arrow D). The swivel movement of the robot body assembly 130 is produced, for example, by means of an actuator (not shown) which is provided in a lower base portion 134. The robot body assembly 130 also includes an intermediate link or pillar 132 operatively affixed at the lower base portion 134 to the robot mount 144, to pivot at first joint 136 about a horizontal axis, e.g., axis Y (such movement depicted for instructional purposes by arrows E1 and E2).

A top end portion of the intermediate link 132 is pivotably connected at second joint 138 with a head casing, indicated generally with reference numeral 140. The robot arm 110 is mounted at one end to the robot wrist 108, and at the other end thereof to the head casing 140 to swivel or pivot via second joint 138 about a horizontal axis, e.g., axis Y (such movement depicted for explanatory purposes with arrows F1 and F2 in FIG. 2). Robot joint actuators 142 for the robot arm 110 are provided in the head casing 140.

The robotic welding cell 100 also includes a controller 104, depicted in FIG. 2 in an exemplary embodiment as a microprocessor based electronic control unit (ECU), having a suitable amount of programmable memory 150. The controller 104 further includes a control method (or algorithm) of optimizing collision free path planning 200 for automating the determination of, and assuring the realization of optimal weld gun orientations and robot paths in the robotic welding system 100, as will be discussed in detail below with respect to both FIGS. 2 and 3.

The controller 104 is configured or programmed, in part, to control the automation of the robot 102, including the movement of all corresponding robot components. By way of example, the controller 104 is configured to control the swiveling of lower base portion 134, the pivoting of intermediate link 132 and robot arm 110, and the rotation and pivoting of weld gun 106 via robot wrist 108. The controller 104 is also configured to control the selective welding of the weld gun 106, i.e., the opening or separation and closing or clamping of the first and second welding gun arms 114, 116 and corresponding actuation and deactivation of electrodes 113, 115.

Figure 3:
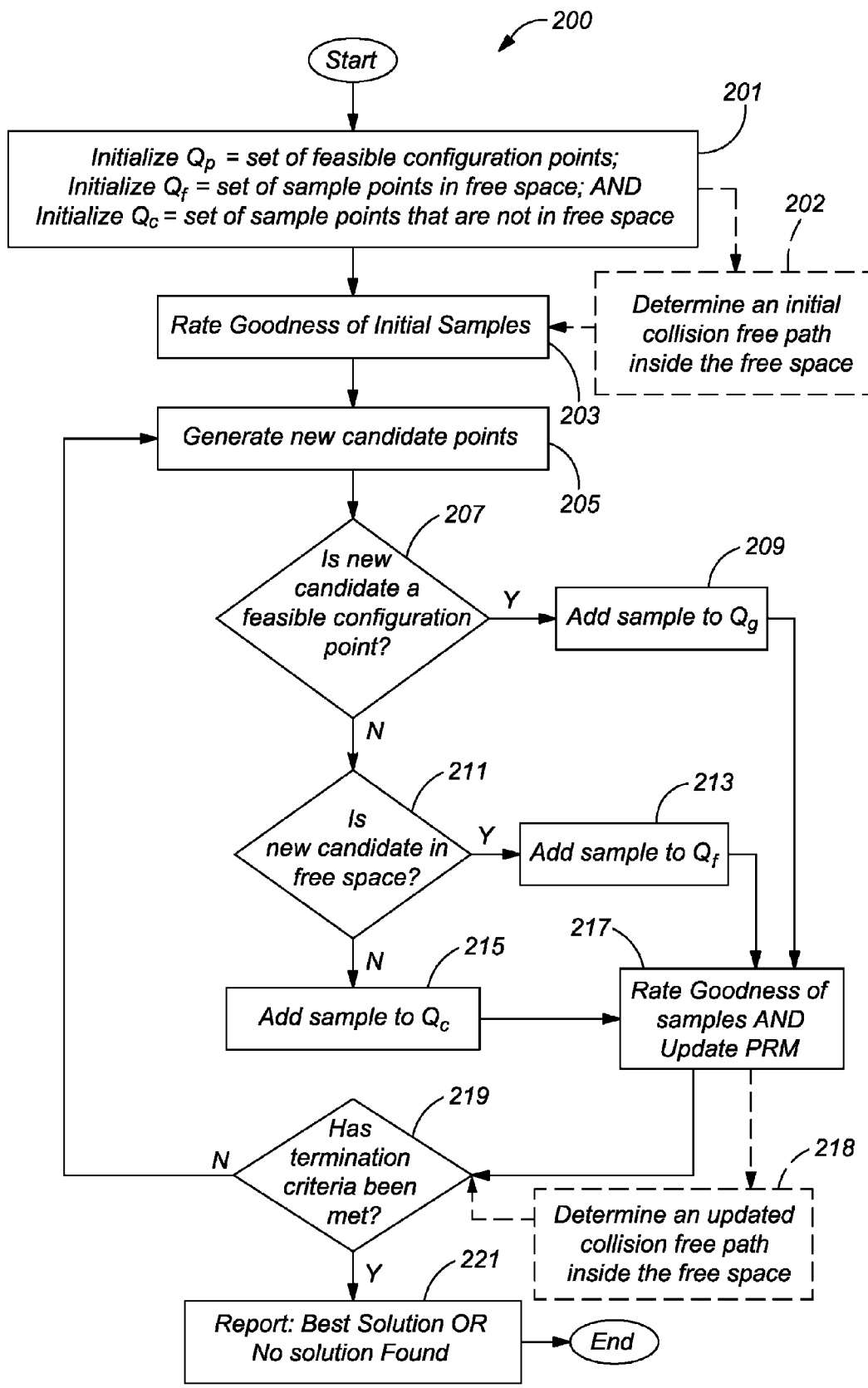
FIG. 3 is a flow chart illustrating the algorithm or method of automated robotic welding in accordance with a preferred embodiment of the present invention.

With reference now to the flow chart in FIG. 3, a method of optimizing collision free path planning for an automated manufacturing cell, namely the method of automating the determination of, and assuring the realization of optimal weld gun orientations (e.g., approach and orientation vectors) and robot paths in a robotic welding system is shown generally as 200 in accordance with a preferred embodiment of the present invention. The method or algorithm 200 is described herein with respect to the structure illustrated in FIG. 2. However, the present invention may also be applied to other types of robotic welding systems. In a similar regard, the method 200 can also be applied to other automated manufacturing systems without departing from the intended scope of the present invention.

As will be understood from the following description, the method 200 (which may also be referred to as an "optimizer shell") is used after each iteration of a collision free path planner (i.e., can "call upon" the path planner application) or within the path planner itself (i.e., is part of the path planner application), or both, to generate new candidate intermediate configurations in the path planning algorithm in order to adjust preselected "optimization parameters". Optimization parameters, also known in the art as design parameters, are input or candidate solutions for optimizing (i.e., maximizing or minimizing) an objective cost function or fitness rating. The optimization parameters are, for example, the robot home position, goal position, and/or weld gun orientations. The cost function, indicative of manufacturing cost, quality, and productivity, is affected by many variables, such as, but not limited to, smoothness of robot path and joint motion, geometric clearances between obstacles, length of time to perform a command (i.e., cycle time), etc. The cost function is defined on the points and or paths, such as points 16 and path 12 in configuration space 10 of FIG. 1, and, at each iteration of the path planner, the optimizer shell or method 200 improves the partial solution until the objective is satisfied (that is, within an acceptable margin) or iteration limits are exhausted.

The method 200 of FIG. 3 may be performed in "real time" (as depicted in FIG. 2) or "off line"—e.g., as a "pre-processing" step with a separate computer, without departing from the intended scope of the present invention. The "preprocessing unit" used to determine/optimize the "repeated motions" of the robot can, by way of example, be an engineering design/analysis computer/software or CAD/CAM system. The motion specifications are sent by the preprocessing unit or CAD/CAM system to a controller, such as control unit 104 of FIG. 2, to coordinate the real time motion of the robot joints to follow the specified motions in a repeated fashion.

Figure 1:
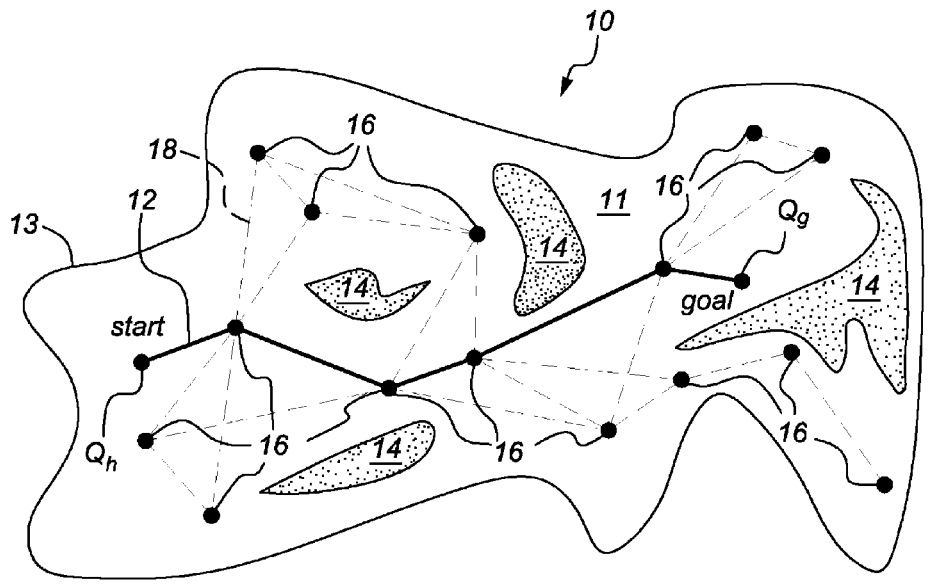
FIG. 1 is a representative illustration of a multi-dimensional configuration space and PRM generated probabilistic roadmap represented therein for a set of "goal" weld points assigned for a welding operation in which a single weld gun is selected to perform all of the corresponding operations.

The method 200 begins with initializing a first plurality or set of sample points Qf that are located in a free space, such as free space 11 of FIG. 1, and a second plurality or set of sample points Qc that are not located in the free space as part of step 201. In addition, step 201 also includes configuring a set of feasible configuration points or parameters Qp. The configuration points Qp may include not only robot joint angles, but additional parameters related to the optimization, such as the "home" configuration for the robot, the orientation of the gun, parameters that configure the gun from a library, etc. However, the configuration points Qp need not necessarily be optimization variables.

As step 203, a first "goodness rating" of the first and second pluralities of sample points Qf, Qc and the plurality of feasible configuration points Qp is determined. Regardless of the optimization method used herein, any model parameter optimization requires a measure of "goodness"—how well the model represents or "covers" the actual system. As an alternative to maximizing the goodness of a model, parameter optimization methods can also minimize the difference between the model's activity and the target activity as measured by a distance or error function. Determining the goodness ratings of the various points Qf, Qp, Qc preferably includes determining a respective cost function. In addition, or as an alternative, the goodness ratings determined in method 200 are inversely proportional to their respective cost function.

Still referring to FIG. 3, step 205 includes generating a plurality of new candidate points. According to the preferred embodiment presented herein, an optimization methodology is used to compute the new candidate points. The type of optimization methodology used may include, by way of example only, genetic algorithms, energy minimization techniques, evolutionary computation methods, and permutations of the same.

The method 200 also includes, as step 207, determining if each of the new candidate points is a feasible configuration point Qp. If the new candidate is a feasible configuration point, step 209 requires that the new candidate point be added to the plurality of feasible configuration points. If not, the method proceeds to step 211, wherein it is determined if the new candidate point is located in the free space, e.g., free space 11 of FIG. 1. If the new candidate is located in the free space, step 213 of FIG. 3 requires that the new candidate point be added to the first plurality of sample points. If the new candidate is not located in the free space and is not a feasible configuration point, step 215 requires that the new candidate point be added to the second plurality of sample points. Once steps 207-215 are complete, where applicable, step 217 then determines a second goodness rating of the first and second pluralities of sample points and the plurality of feasible configuration points in a manner similar to that of determining the first goodness rating.

Step 217 of FIG. 3 also proceeds to update a motion planning algorithm. Preferably, the motion planning algorithm is a probabilistic roadmap (PRM) path planner. In this regard, method 200 preferably also includes determining a preliminary collision free path inside the free space as step 202, prior to rating the goodness of the initial samples at step 203. Correspondingly, an updated collision free path inside the free space is determined at step 218 in response to the updating of the probabilistic roadmap path planner in step 217. The updated collision free path is preferably determined in step 218 by the PRM iteratively searching for the collision free path by adding at least one of the sample points Qp, Qf, Qc or at least one edge, e.g., edge 13 of FIG. 1, or both, to the free space at each iteration.

Still referring to FIG. 3, the method 200 then proceeds to step 219 to determine if a termination criteria has been met. Ideally, the termination criteria is an optimized goal configuration, an optimized home configuration, an optimized weld gun orientation, an optimized collision free path, and a pre-determined threshold number of iterations.

An algorithm which yields a complete solution is one which provides a correct solution, if one exists, or indicates that there is no solution. A probabilistically complete algorithm is one which, if allowed to run long enough (e.g. infinitely long), will produce a complete solution. Accordingly, step 221 requires the optimizer shell or method 200 to return a best solution or report "success" if the objective saturates—i.e., the termination criteria has been met with an optimized configuration parameter, or will return no solution is found or report "failure" if the number of iterations exceed the threshold number of iterations. Otherwise, the method will return to step 205, generate new candidate points, and proceed again to steps 207 through 219.

The method 200 preferably includes at least steps 201-221. However, it is within the scope and spirit of the present invention to omit steps, include additional steps, and/or modify the order presented in FIG. 3.

While the best modes for carrying out the present invention have been described in detail herein, those familiar with the art to which this invention pertains will recognize various alternative designs and embodiments for practicing the invention within the scope of the appended claims.

The invention claimed is:

1. A method of optimizing collision free path planning for an automated manufacturing cell, comprising:
   initializing a plurality of feasible configuration points;
   initializing a first plurality of sample points located in a free space;
   initializing a second plurality of sample points not located in said free space;
   determining an initial goodness rating of said first and second pluralities of sample points and said plurality of feasible configuration points;
   generating a plurality of new candidate points;
   determining if each of said new candidate points is a feasible configuration point;
   adding respective ones of said new candidate points to said plurality of feasible configuration points if said respective ones are feasible configuration points;
   determining if said respective ones of said new candidate points are located in said free space if said respective ones are not feasible configuration points;
   adding said respective ones to said first plurality of sample points if said respective ones are located in said free space and are not feasible configuration points;
   adding said respective ones to said second plurality of sample points if said respective ones are not located in said free space and are not feasible configuration points;
   determining an updated goodness rating of said first and second pluralities of sample points and said plurality of feasible configuration points;
   updating a motion planning algorithm;
   determining if a termination criteria has been met;
   reporting one of a best solution and no solution as the optimized collision free path if said termination criteria has been met; and
   repeating said generating a plurality of new candidate points and determining if each of said new candidate points is a feasible configuration point if said termination criteria has not been met
   wherein a controller is operatively connected to the automated manufacturing cell and the method is programmed into and is executed by the controller.

2. The method of claim 1, wherein said generating said plurality of new candidate points is performed using an optimization methodology.

3. The method of claim 2, wherein said optimization methodology is one of a genetic algorithm, an energy minimization technique, and an evolutionary computation method.

4. The method of claim 1, wherein said motion planning algorithm is a probabilistic roadmap path planner.

5. The method of claim 4, further comprising:
   determining an initial collision free path inside said free space prior to said determining said initial goodness rating; and
   determining an updated collision free path inside said free space in response to said updating of said probabilistic roadmap path planner.

6. The method of claim 5, wherein said determining an updated collision free path consists of said probabilistic roadmap path planner iteratively searching for a collision free path by adding at least one of said new candidate points to said first plurality of sample points or at least one edge to said free space, or both, at each iteration.

7. The method of claim 1, wherein said termination criteria is one of an optimized goal configuration, an optimized home configuration, an optimized weld gun orientation, an optimized collision free path, and a predetermined threshold number of iterations, or combinations thereof.

8. The method of claim 1, wherein said determining said initial and updated goodness ratings respectively include determining an initial cost function and an updated cost function.

9. The method of claim 8, wherein said goodness ratings are inversely proportional to said respective cost functions.

10. The method of claim 1, wherein said plurality of feasible configuration points is one of a plurality of home configuration points and a plurality of goal configurations points.

11. A method of automating the determination of, and assuring the realization of optimal weld gun orientations and robot paths in a robotic welding system having a weld gun and at least one predetermined weld point, comprising:
   initializing a plurality of feasible configuration points;
   initializing a first plurality of sample points located in a free space;
   initializing a second plurality of sample points not located in said free space;
   determining an initial goodness rating of said first and second pluralities of sample points and said plurality of feasible configuration points;
   generating a plurality of new candidate points using an optimization methodology;

determining if each of said new candidate points is a feasible configuration point;

adding respective ones of said new candidate points to said plurality of feasible configuration points if said respective ones are feasible configuration points;

determining if said respective ones of said new candidate points are located in said free space if said respective ones are not feasible configuration points;

adding said respective ones to said first plurality of sample points if said respective ones are located in said free space and are not feasible configuration points;

adding said respective ones to said second plurality of sample points if said respective ones are not located in said free space and are not feasible configuration points;

determining an updated goodness rating of said first and second pluralities of sample points and said plurality of feasible configuration points;

updating a probabilistic roadmap path planner;

determining if a termination criteria has been met;

reporting one of a best solution and no solution as the optimal weld gun orientations and robot paths if said termination criteria has been met; and repeating said generating a plurality of new candidate points and determining if each of said new candidate points is a feasible configuration point if said termination criteria has not been met;

wherein said termination criteria is one of an optimized goal configuration, an optimized home configuration, an optimized weld gun orientation, an optimized collision free path, and a predetermined threshold number of iterations; and wherein a controller is operatively connected to the robotic welding system and the method is programmed into and is executed by the controller.

12. The method of claim 11, wherein said optimization methodology is one of a genetic algorithm, an energy minimization technique, and an evolutionary computation method.

13. The method of claim 11, further comprising:

determining an initial collision free path inside said free space prior to said determining said initial goodness rating; and determining an updated collision free path inside said free space in response to said updating of said probabilistic roadmap path planner.

14. The method of claim 13, wherein said determining an updated collision free path consists of said probabilistic roadmap path planner iteratively searching for a collision free path by adding at least one of said new candidate points to said first plurality of sample points or at least one edge to said free space, or both, at each iteration.

15. The method of claim 11, wherein said determining said initial and updated goodness ratings respectively include determining an initial cost function and an updated cost function.

16. The method of claim 15, wherein said goodness ratings are inversely proportional to said respective cost functions.

17. The method of claim 11, wherein said plurality of feasible configuration points is one of a plurality of home configuration points and a plurality of goal configurations points.

18. An apparatus for welding at least one work piece at one or more weld points, comprising:

a weld gun configured to selectively complete a welding operation at the one or more weld points;

an automated support arm operatively connected to said weld gun and configured to reposition said weld gun;

a controller operatively connected to said support arm and weld gun and configured to control said repositioning and said selective welding of said weld gun;

wherein said controller is programmed and configured to determine an optimization parameter via:

initializing a plurality of feasible configuration points;

initializing a first plurality of sample points located in a free space;

initializing a second plurality of sample points not located in said free space;

determining an initial goodness rating of said first and second pluralities of sample points and said plurality of feasible configuration points;

generating a plurality of new candidate points using an optimization methodology;

determining if each of said new candidate points is a feasible configuration point;

adding respective ones of said new candidate points to said plurality of feasible configuration points if said respective ones are feasible configuration points;

determining if said respective ones of said new candidate points are located in said free space if said respective ones are not feasible configuration points;

adding said respective ones to said first plurality of sample points if said respective ones are located in said free space and are not feasible configuration points;

adding said respective ones to said second plurality of sample points if said respective ones are not located in said free space and are not feasible configuration points;

determining an updated goodness rating of said first and second pluralities of sample points and said plurality of feasible configuration points;

updating a probabilistic roadmap path planner;

determining if a termination criteria has been met;

reporting one of a best solution and no solution if said termination criteria has been met; and repeating said generating a plurality of new candidate points if said termination criteria has not been met.

19. The apparatus of claim 18, wherein said optimization parameter includes at least one of an optimized goal configuration, an optimized home configuration, an optimized weld gun orientation, and an optimized collision free path.

20. The apparatus of claim 18, wherein said controller is further programmed and configured to determine an initial collision free path inside said free space prior to said determining said initial goodness rating; and determine an updated collision free path inside said free space in response to said updating of said probabilistic roadmap path planner.

* * * * *